(12) United States Patent
Williams et al.

(10) Patent No.: US 12,711,241 B2
(45) Date of Patent: Aug. 18, 2026

(54) SYSTEMS AND METHODS FOR SECURITY OBSERVABILITY MODEL AND DESIGN FOR AGENTS

(71) Applicants: Jeffrey Williams, Ashton, MD (US); Arshan Dabirsiaghi, Parkville, MD (US); Brian Sowers, Parkville, MD (US)

(72) Inventors: Jeffrey Williams, Ashton, MD (US); Arshan Dabirsiaghi, Parkville, MD (US); Brian Sowers, Parkville, MD (US)

( * ) Notice: Subject to any disclaimer, the term of this patent is extended or adjusted under 35 U.S.C. 154(b) by 0 days.

(21) Appl. No.: 18/766,607

(22) Filed: Jul. 8, 2024

(65) Prior Publication Data

US 2026/0010637 A1 Jan. 8, 2026

(51) Int. Cl.
*G06F 21/57* (2013.01)

(52) U.S. Cl.
CPC .................................. *G06F 21/577* (2013.01)

(58) Field of Classification Search
None
See application file for complete search history.

(56) References Cited

U.S. PATENT DOCUMENTS 11,347,622 B1 * 5/2022 Agarwal ............... G06F 11/323
11,494,171 B1 * 11/2022 Acharya ............... H04L 9/0861
2023/0006907 A1 * 1/2023 Mackie ................... H04L 43/10

* cited by examiner

*Primary Examiner* — Fatoumata Traore

(57) ABSTRACT

An architecture of observability can be viewed as consisting of: Data observation and aggregation Data transmission Data storage Data visualizations and intelligence insights Agents are concerned with "Data observation and aggregation" and "Data Transmission". The backend SaaS service is concerned with "Data Transmission", "Data Storage", and "Data visualizations and intelligence insights". The scope of this article will specifically focus on Agent concerns.

6 Claims, 4 Drawing Sheets

SYSTEMS AND METHODS FOR SECURITY OBSERVABILITY MODEL AND DESIGN FOR AGENTS

CLAIM OF PRIORITY

This application claims priority to U.S. Provisional Patent Application No. 63/471,500, filed on 7 Jun. 2023 and titled SYSTEMS AND METHODS FOR SECURITY OBSERVABILITY MODEL AND DESIGN FOR AGENTS. This provisional application is hereby incorporated by reference in its entirety.

BACKGROUND

When creating features that span multiple agents, it helps to have a mental model that abstracts specific agent concerns so that the feature can be consistently communicated to each team. Each team can think about how the feature should be handled within the implementation specific concepts of their agent, but the overall design and description of the feature should be devoid of those quirks and concerns.

Additionally, describing high level designs for features and behaviors needs a common language that does not become complicated by the differences between how agents for different languages need to accomplish their goals. From a high level, information can be about, inter alia: sensors, what data the sensors 'see', how that data can be summarized into a meaningful metric, how the metric information is transmitted to a collector backend in a SaaS platform services, and how this data should be stored and managed in a scalable way.

Accordingly, improvements to a mental model for agents with a Ubiquitous Language that can be applied to all agents is desired.

Figure 1:
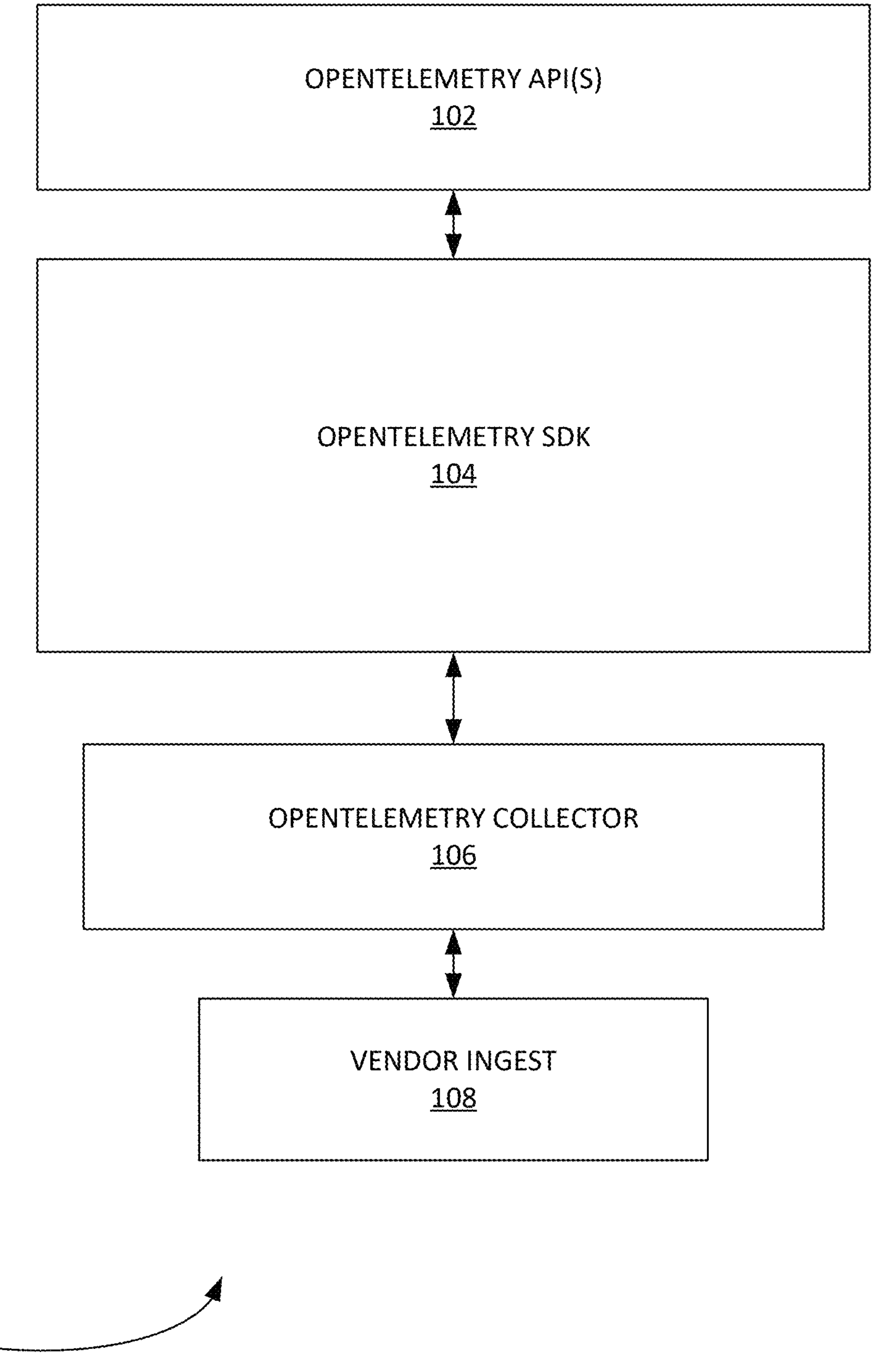
FIG. 1 illustrates an example system for implementing OpenTelemetry, according to some embodiments.

The Figures described above are a representative set and are not exhaustive with respect to embodying the invention.

DESCRIPTION

Disclosed are systems, methods, and articles for manufacture for security observability model and design for agents. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) is a set of subroutine definitions, communication protocols, and/or tools for building software. An API can be a set of clearly defined methods of communication among various components.

OpenTelemetry is an open-source CNCF (Cloud Native Computing Foundation) project. OpenTelemetry can provide a collection of tools, APIs, and SDKs for capturing metrics, distributed traces and/or logs from various applications. OpenTelemetry is an open-source standard and set of technology that captures and exports data from cloud native applications.

Example Methods and Systems

FIG. 1 illustrates an example system 100 for implementing OpenTelemetry, according to some embodiments. System 100 can include OpenTelemetry API(S) 102 that can offer a single set of APIs and libraries that standardize and enable the collection and transference of telemetry data. System 100 can include OpenTelemetry SDK(s) 104. OpenTelemetry SDK(s) 104 can include various SDKs (e.g. reference implementations of the APIs). The SDK(s) can be created for languages (e.g. Python, Java, Erlang, Go, etc.). An OpenTelemetry collector 106 can provide a mechanism for collecting critical application and infrastructure telemetry data. Additionally, vendor ingest 108 can provide integration points f to ingest the collected data (e.g. local ingestion, span ingestion, etc.).

System 100 can be used to scale feature development by placing an abstraction over, inter alia: sensors, what data the sensors 'see', how that data can be summarized into a meaningful metric, how the metric information is transmitted to a collector backend in a SaaS platform services, and how this data should be stored and managed in a scalable way. This abstraction can describe the domain of sensors, instrumentation, and data collection.

In some example embodiments, system 100 provides an architecture of observability. This can be viewed as consisting of: data observation and aggregation, data transmission, data storage, and data visualizations and intelligence insights. Agents are concerned with "data observation and aggregation" and "data transmission". The backend Saas service is concerned with "data transmission", "data storage", and "data visualizations and intelligence insights".

With respect to agent concerns, OpenTelemetry has a well-defined data model that closely aligns with an operational agent model. It is noted that the OpenTelemetry model can be modified and/or other similar models used in other various examples. For example, OpenTelemetry libraries can be used directly to solve some of the problems or assisting in areas should an agent team choose to use them. In this way, agent teams can rely on the OpenTelemetry data model documentation for any gaps of descriptions and/or motivations.

OpenTelemetry 104 portion of the system 100 can focus Meters, or the portion that collects and distributes Metrics. A tracer may be included as well. An agent developer can use the OpenTelemetry SDK model and identify pieces of their agent implementation to which the responsibility maps. Again, a modification/addition of the Open Telemetry model can include filling a gap between observability concepts and application security. It is noted that traditional observability systems may simply observe data without changing it. This makes them very safe, relatively speaking. The present system 100 can replace object instances at runtime to perform string tracking in an effort to keep the user data exactly the same but add metadata to the object. This is an important concept to consider whenever the model is used for domain observability operations.

Figure 2:
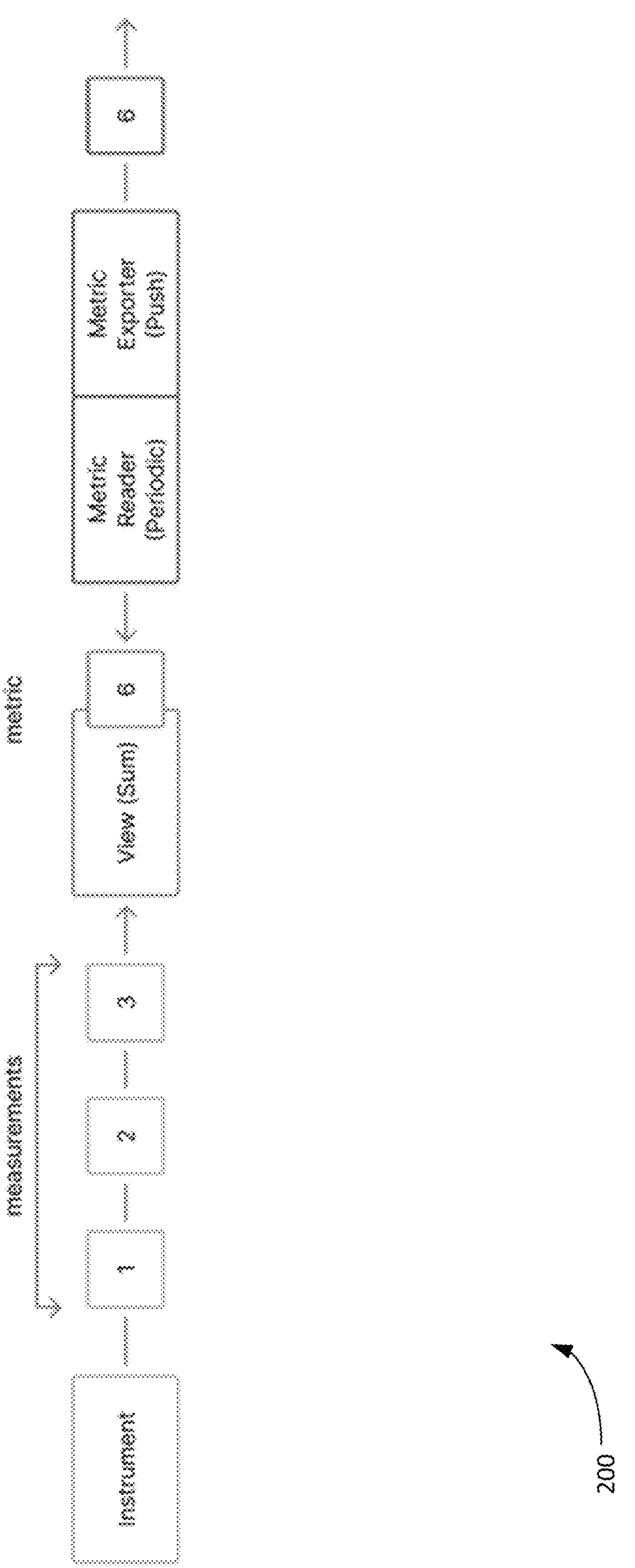
FIG. 2 illustrates an example schematic of a data observation and aggregation OpenTelemetry model, according to some embodiments.

FIG. 2 illustrates an example schematic 200 of a data observation and aggregation OpenTelemetry model, according to some embodiments. Data Observation and Aggregation OpenTelemetry provides a model that captures what "observability" consists of and how the different parts interact (e.g. as shown in schematic 200).

Figure 3:
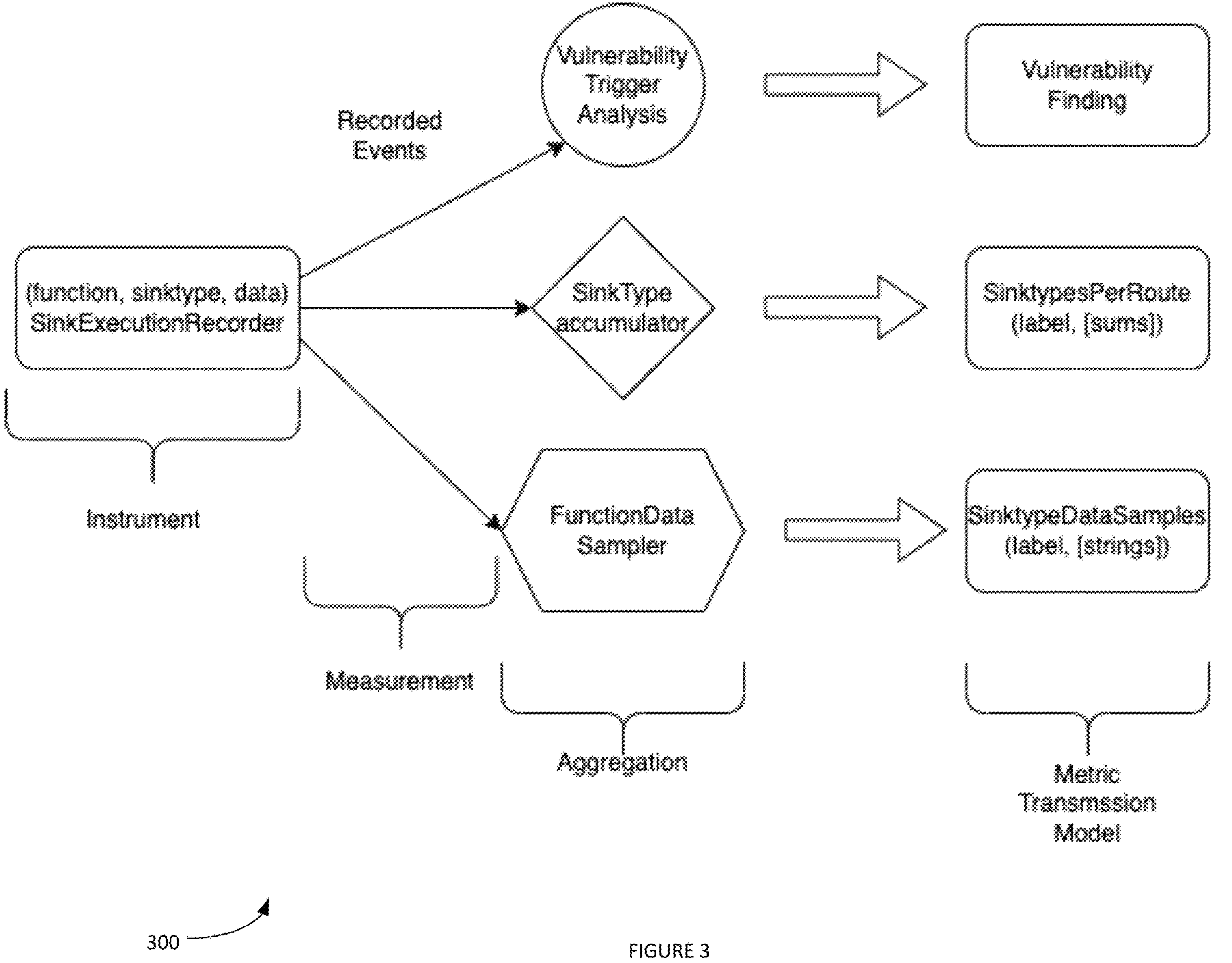
FIG. 3 illustrates an example Event Model, according to some embodiments.

FIG. 3 illustrates an example Event Model 300, according to some embodiments. Event Model 300 can be used for data origination in the agent. Individual instruments can produce Events (e.g. and/or observations). These events carry the observed data to something that records the observation. This step is called aggregation. Because of the volume of expected events, they are generally not transmitted to a Collector on the backend without going through some type of aggregation or summarization step to compress the Events down to meaningful metrics. It is noted that in some historical embodiments, a Teamserver may have been viewed as the "backend Collector" but it will not be in this design. It is also noted that one event can be aggregated into multiple forms and sent out as separate metric streams. However, various vulnerabilities can be reported to the Teamserver. Event Model 300 illustrates how example OpenTelemetry models can be applied to a specific business domain.

In some examples, an Instrument may produce Measurements. Measurements can be aggregated and converted to "MetricDataStreams" to be transmitted upstream. An Aggregation step can be agent specific and rely on the agent providing appropriate storage for the aggregated data. Storage may need to exist for only one Request Scope lifecycle and/or multiple Request Scope lifecycles. This is dependent upon what is to be aggregated. A storage scope that exists across multiple Request Scope lifecycles can be used as a way to decouple the Collector transmission intervals from the agent-host traffic load frequency.

Figure 4:
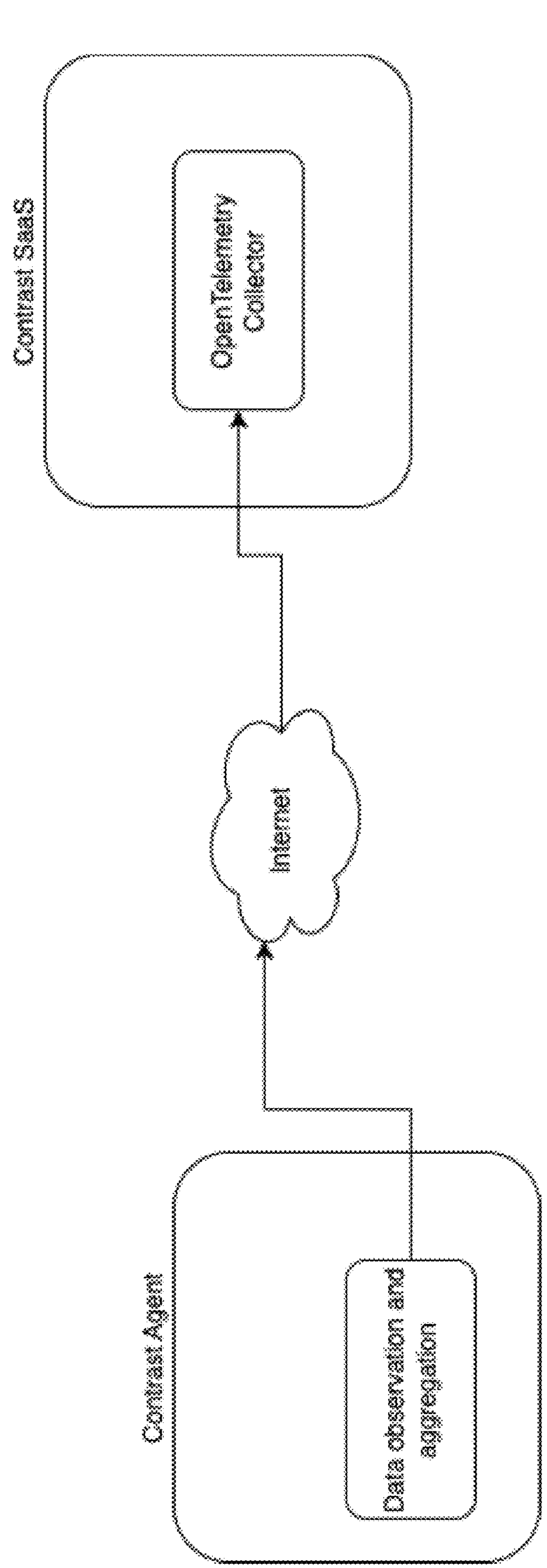
FIG. 4 illustrates an example process for Data Transmission, according to some embodiments.
Figure 4:

FIG. 4 illustrates an example process 400 for Data Transmission, according to some embodiments. Transmission of data to the Collector can be decoupled from an activity on the application under observation. Otherwise, as agent instances grow, there may be a high potential to DDOS a Collector instance with millions of agents attempting to send some ratio of their production load activity to it. Transmissions data streams can also be quickly decomposable to allow for effective horizontal scaling at the ingestion point. Finally, effective controls for cloud computing costs are something that must be considered.

Aside from the performance and scalability of the communication protocol, decoupling agents and a communications protocol from the data model can also be implemented. A communication protocol can be abstracted from the data model on the backend. This can enable agents to send arbitrary observations to a Collector without the ingestion point rejecting the request because of unknown data. The current DTM of Teamserver embeds the data model into communications because the data is directly deserialized into the actual objects of the business domain. The Teamserver can enhance its ingestion on existing endpoints when the backend data model changes. A mix of agents using the protocol can also be implemented with some agents sending data in an older model and other agents sending data in a newer model (e.g. as provided herein). Data transmission can use a generalized protocol for sending observation data (e.g. rather than specializing for a security system's current business domain model).

Agents are now discussed. Agents are responsible for gathering security relevant data from an application, analyzing that data, and reporting findings to Contrast when necessary. Contrast supports real-time application security through all phases of your software development life cycle (SDLC). In specific situations, a Contrast agent can also take actions within an application to prevent exploitation or enable a security defense. A Contrast agent gathers security relevant information using a variety of security instrumentation techniques, including code scanning, library scanning, instrumenting an application, configuration file scanning, and other techniques. Any security instrumentation technique that gathers information is a sensor. Sensors generate events that snapshot information directly from within an application. For example, a sensor might capture an incoming HTTP parameter, or the details of a SQL query being made to the database. Some sensors may also take action if necessary to help strengthen defenses or block malicious activity, typically by throwing a security exception that causes a vulnerability to be bypassed. Events generated by sensors are all reported to the tracking and analysis part of the agent. Over time, the analysis engine receives events from all over the code of the application and builds them into traces. The analysis engine watches these traces for patterns of behavior that represent a violation of the Contrast rules. For example, the analysis engine might see a data flow like this: An incoming HTTP parameter event Then another event shows that parameter being appended to a SQL query Finally another event shows that query being sent to a database If the analysis engine sees that data flow without the proper defenses (escaping or parameterization), it recognizes that trace to match the Contrast rule for SQL injection reports it to Contrast. The vast majority of the analysis is done locally in the agent, which enables Contrast's scalability and performance. Use the agents that matches the language of the application you want to instrument: Java instruments Java web applications and web APIs running on your container . . . . NET Framework instruments .NET web applications and APIs running on IIS . . . . NET Core instruments applications and APIs running in the .NET Core runtime. Node.js instruments Node.js web applications and APIs. PHP analyzes PHP web applications at runtime for library usage and vulnerability detection. Python instruments Django, Flask and Pyramid web applications. Ruby instruments Ruby on Rails web applications. Go instruments Go web applications for library support and vulnerability reporting. Agents Supports a variety of programming languages, frameworks, and container technologies that instrument your applications with sensors. Contrast Assess: Uses tuneable detection rules to accurately find vulnerabilities. It provides details on how the issue was discovered, how to reproduce it, and how to fix it. Scan: Identifies vulnerabilities in uploaded binary packages by performing a fast and efficient static scan. Protect: Automatically identifies attacks and either monitors them or prevents them from being exploited in production. Protect discovers and blocks attacks from within the running application but can also integrate with Web Application Firewalls (WAF).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A system for security observability for agents, comprising:

with at least one hard-ware computer processor; and a non-transitory machine-readable medium storing computer-executable instructions that, when executed by the at least one hard-ware processor, configure the at least one hard-ware processor to perform operations comprising:

at least one agent configured to gather security relevant data from an application using a plurality of sensors that generate events that snapshot information from within the application;

an aggregation operation configured to record the events and to compress the events into meaningful metrics including one or more metric data streams;

a transmission operation configured to transmit the one or more metric data streams to a collector according to transmission intervals that are decoupled from an activity on the application under observation; and a backend software-as-a-service (SaaS) service configured to perform data storage and to provide data visualizations and intelligence insights based on the transmitted data, wherein the transmission operation uses a communication protocol that is abstracted from a backend data model to enable agents to send arbitrary observations to the collector without an ingestion point rejecting a request because of unknown data, and to enable a mix of agents sending data in an older model and other agents sending data in a newer model.

2. The system of claim 1, wherein the plurality of sensors capture at least one of an incoming hypertext transfer protocol (HTTP) parameter or details of a structured query language (SQL) query made to a database.

3. The system of claim 2, wherein the aggregation operation aggregates at least one event into multiple forms and outputs the at least one event as separate metric data streams.

4. The system of claim 3, wherein the backend software-as-a-service (SaaS) service is concerned with data transmission, data storage, and data visualizations and intelligence insights.

5. The system of claim 4, wherein the transmission operation transmits the one or more metric data streams in a manner that mitigates a denial-of-service condition caused by a plurality of agents attempting to send production-load activity to the collector.

6. The system of claim 5, wherein the transmission operation transmits the one or more metric data streams as data streams that are decomposable to enable horizontal scaling at an ingestion point.

* * * * *